United States Patent
Choi et al.

(10) Patent No.: US 9,923,225 B2
(45) Date of Patent: Mar. 20, 2018

(54) ION TRANSPORT MATERIAL, ELECTROLYTE MEMBRANE COMPRISING SAME, AND METHOD FOR PRODUCING SAME

(71) Applicant: LG Chem, Ltd., Seoul (KR)

(72) Inventors: Hyungsam Choi, Daejeon (KR); Joong Jin Han, Daejeon (KR); Chong Kyu Shin, Daejeon (KR); Seungpyo Jeong, Daejeon (KR); Youngjea Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/022,454

(22) PCT Filed: Oct. 17, 2014

(86) PCT No.: PCT/KR2014/009810
§ 371 (c)(1),
(2) Date: Mar. 16, 2016

(87) PCT Pub. No.: WO2015/057025
PCT Pub. Date: Apr. 23, 2015

(65) Prior Publication Data
US 2016/0226091 A1    Aug. 4, 2016

(30) Foreign Application Priority Data
Oct. 18, 2013 (KR) .................. 10-2013-0124904

(51) Int. Cl.
*H01M 8/1027* (2016.01)
*H01M 8/1051* (2016.01)
(Continued)

(52) U.S. Cl.
CPC ........ *H01M 8/1051* (2013.01); *H01M 8/102* (2013.01); *H01M 8/1027* (2013.01);
(Continued)

(58) Field of Classification Search
None
See application file for complete search history.

(56) References Cited

U.S. PATENT DOCUMENTS

2004/0219413 A1    11/2004  Kim et al.
2009/0169956 A1*    7/2009  Lee ..................... H01B 1/122
                                                    429/454

(Continued)

FOREIGN PATENT DOCUMENTS

EP     2750233 A1    7/2014
JP     2004335472 A  11/2004
(Continued)

OTHER PUBLICATIONS

Supplementary European Search Report for EP Application No. 14854331.7 dated Feb. 10, 2017.
(Continued)

*Primary Examiner* — Yoshitoshi Takeuchi
(74) *Attorney, Agent, or Firm* — Lerner, David, Littenberg, Krumholz & Mentlik, LLP

(57) ABSTRACT

The present application relates to an ion transport material, an electrolyte membrane including the same, and a method for manufacturing the same, and more specifically, provides an ion transport material in which inorganic particles are dispersed in a peripheral portion of a sulfonic acid group of a partially fluorinated polymer containing sulfonic acid, an electrolyte membrane including the same, and a method for manufacturing the same.

19 Claims, 1 Drawing Sheet

(51) Int. Cl.
   *H01M 8/102*     (2016.01)
   *H01M 8/18*      (2006.01)
   *H01M 8/20*      (2006.01)
   *H01M 8/1039*    (2016.01)
   *H01M 8/1081*    (2016.01)

(52) U.S. Cl.
   CPC ....... *H01M 8/1039* (2013.01); *H01M 8/1081* (2013.01); *H01M 8/188* (2013.01); *H01M 8/20* (2013.01); *H01M 2300/0082* (2013.01); *H01M 2300/0091* (2013.01); *Y02E 60/528* (2013.01); *Y02P 70/56* (2015.11)

(56) References Cited

U.S. PATENT DOCUMENTS

| | | | |
|---|---|---|---|
| 2010/0168349 A1 | 7/2010 | Fujiwara | |
| 2011/0014544 A1 | 1/2011 | Lee et al. | |
| 2011/0136040 A1* | 6/2011 | Hwang | C08G 65/48 |
| | | | 429/483 |

FOREIGN PATENT DOCUMENTS

| | | |
|---|---|---|
| JP | 2013-177522 A | 9/2013 |
| JP | 2013-221086 A | 10/2013 |
| KR | 10-2003-0076057 | 9/2003 |
| KR | 10-0819332 B1 | 4/2008 |
| KR | 20090037306 A | 4/2009 |
| KR | 10-2010-0006809 | 1/2010 |
| KR | 20100076857 A | 7/2010 |
| KR | 10-2011-0063175 | 6/2011 |
| WO | 2013027758 A1 | 2/2013 |

OTHER PUBLICATIONS

International Search Report for Application No. PCT/KR2014/009810 dated Feb. 26, 2015.

Korean Written Opinion for Application No. PCT/KR2014/009810 dated Feb. 26, 2015.

Office Action from corresponding Korean Application No. 10-2014-0141177, dated May 30, 2016.

* cited by examiner

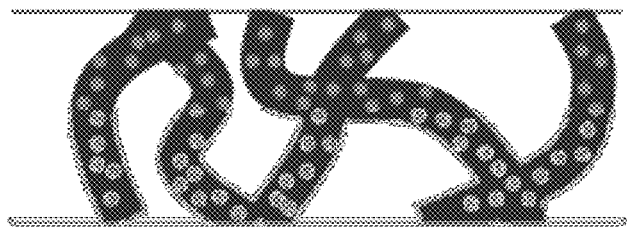

ION TRANSPORT MATERIAL, ELECTROLYTE MEMBRANE COMPRISING SAME, AND METHOD FOR PRODUCING SAME

CROSS-REFERENCE TO RELATED APPLICATION

The present application is a national phase entry under 35 U.S.C. § 371 of International Application No. PCT/KR2014/009810, filed Oct. 17, 2014, which claims priority to Korean Patent Application No. 10-2013-0124904, filed Oct. 18, 2013, the entire contents of which are incorporated herein by reference.

TECHNICAL FIELD

The present application relates to an ion transport material, an electrolyte membrane including the same, and a method for manufacturing the same.

BACKGROUND ART

A fuel cell is an energy conversion device that converts the chemical energy of a fuel directly into electrical energy. That is, the fuel cell uses a fuel gas and an oxidant, and employs a method of producing electric power by using the electrons generated during the redox reaction of the fuel gas and the oxidant. A membrane electrode assembly (MEA) of the fuel cell is a part in which an electrochemical reaction of hydrogen and oxygen occurs, and is composed of a cathode, an anode, and an electrolyte membrane, that is, an ion conductive electrolyte membrane.

A redox flow battery (oxidation-reduction flow battery) is a system in which an active material included in an electrolytic solution is oxidized and reduced and thus charged and discharged, and an electrochemical storage device that stores the chemical energy of the active material directly into electrical energy. A unit cell of the redox flow battery includes an electrode, an electrolyte, and an ion exchange membrane.

Fuel cells and redox flow batteries have been researched and developed as a next-generation energy source due to high energy efficiency and eco-friendly characteristics of less emission of contaminants. Ion exchange membrane materials for a fuel cell and a redox flow battery need to have characteristics of 1) prevention of the cross over of an electrolyte, 2) strong chemical resistance, 3) enhancement of mechanical properties, and 4) a low swelling ratio in addition to excellent proton conductivity. Accordingly, studies on the electrolyte membrane having the characteristics have been continued.

DETAILED DESCRIPTION OF THE INVENTION

Technical Problem

The present application has been made in an effort to provide an ion transport material, an electrolyte membrane including the same, and a method for manufacturing the same.

Technical Solution

In order to solve the problem, the present application provides an ion transport material including: a copolymer including a unit of the following Formula 1 and at least one unit of a unit of the following Formula 2, a unit of the following Formula 3, and a unit of the following Formula 4; and inorganic particles dispersed in a peripheral portion of a sulfonic acid group of the copolymer.

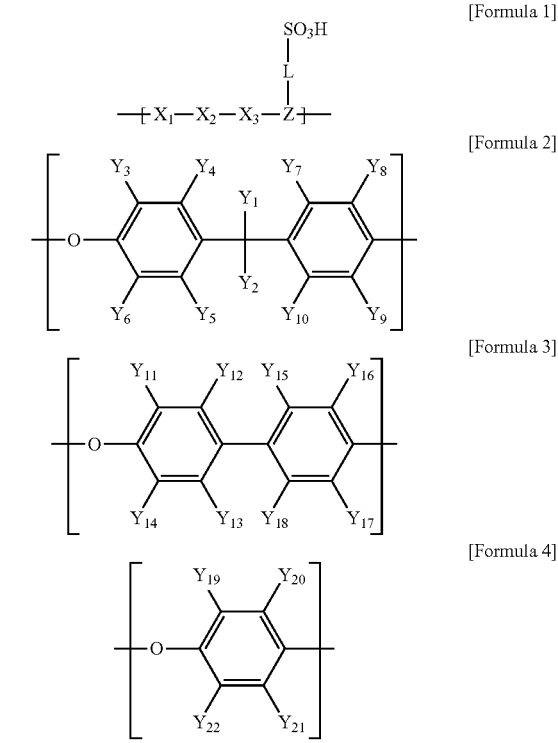

in Formula 1,

Z is a trivalent aromatic cyclic group or a trivalent heterocyclic group,

L is a direct bond, or a divalent linking group, $X_1$ to $X_3$ are the same as or different from each other, and are each independently a direct bond, oxygen (O), a carbonyl group (—CO—), a sulfone group (—SO$_2$—), an arylene group, a heteroarylene group, or *—Z-L-SO$_3$H, and * represents a portion which is linked to a main chain, and in Formulae 2 to 4, $Y_1$ to $Y_{22}$ are the same as or different from each other, and are each independently hydrogen (H), fluorine (F), or a substituted or unsubstituted alkyl group, and the units of Formulae 2 to 4 each have at least one fluorine substituent.

Further, the present application provides an electrolyte membrane including the ion transport material.

In addition, the present application provides a fuel cell including the electrolyte membrane.

Furthermore, the present application provides a redox flow battery including the electrolyte membrane.

Further, the present application provides a method for manufacturing an electrolyte membrane, the method including: preparing solution A containing a copolymer including the unit of Formula 1 and at least one unit of the unit of Formula 2, the unit of Formula 3, and the unit of Formula 4; preparing solution B of a precursor of inorganic particles; mixing solutions A and B; and forming a membrane by using the mixture solution.

Advantageous Effects

The ion transport material according to an exemplary embodiment of the present application has strong mechanical properties because inorganic particles are dispersed in a polymer matrix, and reduces a swelling phenomenon caused by a solvent when used as an electrolyte membrane.

Further, when used as an electrolyte membrane, the ion transport material according to an exemplary embodiment of the present application is excellent in an effect of preventing the cross over of the electrolyte material produced along the ion channels by selectively dispersing inorganic particles in a peripheral portion of a sulfonic acid group.

In addition, the electrolyte membrane including the ion transport material according to an exemplary embodiment of the present application is excellent in ion conductivity.

Furthermore, the method for manufacturing an electrolyte membrane according to an exemplary embodiment of the present application is simple in the manufacturing method due to the mixing of solutions, and the inorganic particles are uniformly dispersed in the peripheral portion of the sulfonic acid group of the copolymer.

Further, the method for manufacturing an electrolyte membrane according to an exemplary embodiment of the present application may form an electrolyte membrane in which inorganic particles are dispersed without separately adjusting the pH because the polymer chains of the copolymer include a sulfonic acid group.

BRIEF DESCRIPTION OF DRAWINGS

FIG. 1 illustrates a form in which inorganic particles are dispersed in a peripheral portion of a sulfonic acid group in an ion transport material according to an exemplary embodiment of the present application.

BEST MODE

Hereinafter, the present specification will be described in more detail.

An exemplary embodiment of the present application provides an ion transport material including a copolymer and inorganic particles dispersed in a peripheral portion of a sulfonic acid group of the copolymer.

The copolymer is a partially fluorinated polymer including a sulfonic acid group. Here, the partially fluorinated polymer means that at least one monomer constituting the polymer has a fluorine group. An example of the partially fluorinated polymer may be a copolymer which includes a fluorinated substituent in a hydrocarbon chain.

In the present application, the "copolymer" may be an alternating copolymer, a block copolymer, a random copolymer, or a graft copolymer.

Specifically, the copolymer may include: the unit of Formula 1; and at least one unit of the unit of Formula 2, the unit of Formula 3, and the unit of Formula 4.

Specifically, $Y_1$ to $Y_{22}$ are the same as or different from each other, and may be each independently a C1 to C10 alkyl group unsubstituted or substituted with hydrogen (H) or fluorine (F).

The substituted or unsubstituted $C_1$ to $C_{10}$ alkyl group may be a chain-type or a branch-type. For example, in the case of the chain-type, the substituted or unsubstituted $C_1$ to $C_{10}$ alkyl group may be —(CQQ')pQ", and Q, Q' and Q" are hydrogen (—H) or fluorine (—F), and p may be 1 to 10.

The units of Formulae 2, 3, and 4 are fluorinated compounds, and thus each have at least one fluorine substituent.

Specifically, L is a direct bond, an alkylene group, an alkenylene group, an alkynylene group, —[(CRR')rO(CR"R"')s]t-, or —CO—Ar—, and here, R, R', R", and R''' are the same as or different from each other, and are each independently hydrogen, an alkyl group, or a halogen group, r and s are 0 to 3, t is 1 to 5, and Ar is an arylene group or a heteroarylene group.

According to an exemplary embodiment of the present application, L is —(CH$_2$)m[(CF$_2$)$_2$O(CF$_2$)$_2$]n-.

m and n are an integer of 0 to 5.

s and r may be s+r≥1.

The alkylene group is an alkylene group having 1 to 20 carbon atoms, the alkenylene group is an alkenylene group having 2 to 20 carbon atoms, the alkynylene group is an alkynylene group having 2 to 20 carbon atoms, but these groups are not limited thereto.

The trivalent aromatic cyclic group is a trivalent aryl group, and the number of carbon atoms of the aryl may be 6 to 60, specifically 6 to 40, and more specifically 6 to 25. Specific examples of the aryl include phenyl, biphenyl, triphenyl, naphthyl, anthryl, chrysenyl, phenanthrenyl, perylenyl, fluoranthenyl, triphenylenyl, phenalenyl, pyrenyl, tetracenyl, pentacenyl, fluorenyl, indenyl, acenaphthylenyl, fluorenyl, and the like, or fused rings thereof, but are not limited thereto.

The trivalent heterocyclic group includes S, O, or N as a heteroatom, and the number of carbon atoms thereof may be 2 to 60, specifically 2 to 40, and more specifically 3 to 25. Specific examples of the heterocyclic include pyridyl, pyrrolyl, pyrimidyl, pyridazinyl, furanyl, thienyl, imidazolyl, pyrazolyl, oxazolyl, isoxazolyl, triazolyl, isothiazolyl, triazolyl, furazanyl, oxadiazolyl, thiadiazolyl, dithiazolyl, tetrazolyl, pyranyl, thiopyranyl, diazinyl, oxazinyl, triazinyl, dioxynyl, triazinyl, tetrazinyl, quinolyl, isoquinolyl, quinazolinyl, isoquinazolinyl, naphthyridyl, acridinyl, phenanthridinyl, imidazopyridinyl, diazanaphthalenyl, triazaindene, indolyl, indolyzinyl, benzothiazolyl, benzoxazolyl, benzoimidazolyl, a benzothiophene group, a benzofuran group, a dibenzothiophene group, a dibenzofuran group, carbazolyl, benzocarbazolyl, phenazinyl, and the like, or fused rings thereof, but are not limited thereto.

The arylene group is a divalent aryl group, and the number of carbon atoms of the aryl may be 6 to 60, specifically 6 to 40, and more specifically 6 to 25. Specific examples of the aryl include phenyl, biphenyl, triphenyl, naphthyl, anthryl, chrysenyl, phenanthrenyl, perylenyl, fluoranthenyl, triphenylenyl, phenalenyl, pyrenyl, tetracenyl, pentacenyl, fluorenyl, indenyl, acenaphthylenyl, fluorenyl, and the like, or fused rings thereof, but are not limited thereto.

The heteroarylene group is a divalent heteroaryl group, the heteroaryl group includes S, O, or N as a heteroatom, and the number of carbon atoms thereof may be 2 to 60, specifically 2 to 40, and more specifically 3 to 25. Specific examples of the heteroaryl include pyridyl, pyrrolyl, pyrimidyl, pyridazinyl, furanyl, thienyl, imidazolyl, pyrazolyl, oxazolyl, isoxazolyl, triazolyl, isothiazolyl, triazolyl, furazanyl, oxadiazolyl, thiadiazolyl, dithiazolyl, tetrazolyl, pyranyl, thiopyranyl, diazinyl, oxazinyl, triazinyl, dioxynyl, triazinyl, tetrazinyl, quinolyl, isoquinolyl, quinazolinyl, isoquinazolinyl, naphthyridyl, acridinyl, phenanthridinyl, imidazopyridinyl, diazanaphthalenyl, triazaindene, indolyl, indolyzinyl, benzothiazolyl, benzoxazolyl, benzoimidazolyl, a benzothiophene group, a benzofuran group, a dibenzothiophene group, a dibenzofuran group, carbazolyl, benzocarbazolyl, phenazinyl, and the like, or fused rings thereof, but are not limited thereto.

In the present application, the "peripheral portion of a sulfonic acid group" means a portion in which an ion transport channel is formed by a sulfonic acid group.

When measurement is made in the form of a solution, a solid or a cast membrane of the copolymer by using a scanning electron microscope (SEM), an atomic force microscope (AFM), and the like, it can be confirmed that hydrophobic portions, which do not include a sulfonic acid group, and hydrophilic portions, which include a sulfonic acid group, are separated from each other in the copolymer due to the phase separation characteristics of hydrophobicity and hydrophilicity. According to the above-described exemplary embodiments of the present application, it can be confirmed that the dispersion density of inorganic particles in a hydrophilic portion including the sulfonic acid group is high, and the portion may be interpreted as "a peripheral portion of a sulfonic acid group". Due to the phase separation characteristics as described above and the dispersion of inorganic particles, the mechanical properties are strengthened, the ion conductivity is improved, and simultaneously, an effect of suppressing the cross over may be obtained.

According to an exemplary embodiment of the present application, inorganic particles are dispersed in the portion of the sulfonic acid group of the copolymer.

According to an exemplary embodiment of the present application, inorganic particles are dispersed only in the peripheral portion of the sulfonic acid group of the copolymer. Accordingly, the concentration of inorganic particles in the peripheral portion of the sulfonic acid group is higher than that in the other portions, or inorganic particles are present only in the peripheral portion of the sulfonic acid group. When inorganic particles are selectively formed only in the peripheral portion of the sulfonic acid group, it is possible to obtain an effect of suppressing the cross over of the electrolyte material produced along the ion transport channel even though a small amount of inorganic particles are contained. That is, even in the case of containing inorganic particles having the same content as in the related art, it is possible to exhibit a better effect of suppressing the cross over as compared to the related art.

According to an exemplary embodiment of the present application, the ratio of the weight of inorganic particles dispersed in the portion including the unit of Formula 1 to the weight of inorganic particles dispersed in the portion including at least one unit of the units of Formulae 2 to 4 in the copolymer may be 70%:30% to 100%:0%, specifically 80%:20% to 100%:0%, based on the total weight of the inorganic particles. That is, the ratio of the weight of inorganic particles dispersed in the hydrophilic portion including a sulfonic acid group to the weight of inorganic particles dispersed in the fluorinated hydrophobic portion in the copolymer may be 70%:30% to 100%:0%, specifically 80%:20% to 100%:0%, based on the total weight of the inorganic particles. When the weight ratio is in the range, inorganic particles are dispersed in the ion transport channel portion, so that it is possible to increase the mechanical strength of the entire material while having an effect of suppressing the cross over. Furthermore, the content of inorganic particles in the ion transport channel portion in which the cross over takes place is increased, and thus it is possible to exhibit a high effect even with a small amount of inorganic particles.

According to an exemplary embodiment of the present application, the content of inorganic particles in the peripheral portion of the sulfonic acid group in the copolymer may be 70 wt % to 100 wt %, specifically 80 wt % to 100 wt %, based on the total weight of the inorganic particles. 70 wt % or more of the inorganic particles may be dispersed in the peripheral portion of the sulfonic acid group.

The content of the inorganic particles may also be confirmed through a two-dimensional photograph captured by using the scanning electron microscope (SEM), the atomic force microscope (AFM), and the like, which are described above.

For example, the ion transport material was formed as a membrane, and the content may be confirmed based on a two-dimensional cross-section obtained by capturing one surface of the membrane using a device, such as an atomic force microscope (AFM), an optical profiler, and a scanning electron microscope (SEM).

The inorganic particles may be present in the form of fine particles or in the form of aggregated particles in the peripheral portion of the sulfonic acid group.

According to an exemplary embodiment of the present application, the inorganic particles have a diameter of 5 to 200 nm, specifically 10 to 100 nm. When the diameter of the inorganic particles is more than 200 nm, there is a problem in that mechanical properties of an electrolyte membrane including an ion transport material deteriorate. Further, when the diameter is in a range of 10 to 100 nm, mechanical properties of the electrolyte membrane may be strengthened, and simultaneously, inorganic particles having a suitable size may be dispersed in an ion transport channel portion, thereby exhibiting an effect of suppressing the cross over and enhancing the performance of transporting ions.

In the present specification, the diameter may mean a length value of the longest line among the lines passing through the center of the particle as a value which represents the size of particles, and a measurement method used in the art may be used. For example, the diameter may be measured by using an optical profiler, a scanning electron microscope (SEM), and the like.

According to an exemplary embodiment of the present application, the inorganic particles may have an average particle diameter of 5 to 200 nm, specifically 10 to 100 nm. Further, when the average particle diameter is in the range, mechanical properties of the electrolyte membrane may be strengthened, and simultaneously, inorganic particles having a suitable size may be dispersed in an ion transport channel portion, thereby exhibiting an effect of suppressing the cross over and enhancing the performance of transporting ions. Here, the particle diameter may be interpreted to be the same as the diameter, and the average particle diameter of the inorganic particles means an average value of the particle diameters of inorganic particles. For the measurement of the average particle diameter, a measurement method used in the art may be used. For example, an average value of the particle diameters may be obtained by capturing particles using an optical profiler, a scanning electron microscope (SEM), and the like, and measuring the particle diameters.

According to an exemplary embodiment of the present application, the inorganic particle is silica.

According to an exemplary embodiment of the present application, the content of the inorganic particles is 2 to 30 parts by weight based on 100 parts by weight of the solid content of the ion transport material, and is preferably 5 to 12 parts by weight based on the solid content of the copolymer. When the content of the inorganic particles is less than 2 parts by weight, an effect of preventing the cross over of an electrolyte material produced along the ion channels is negligible, and when the content is more than 30 parts by weight, mechanical properties of an electrolyte membrane including the ion transport material deteriorate.

According to an exemplary embodiment of the present application, Formula 2 may be represented by the following Formula 2A.

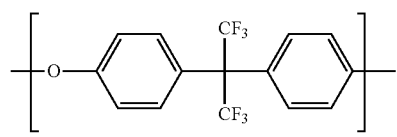

[Formula 2A]

According to an exemplary embodiment of the present application, Formula 3 may be represented by the following Formula 3A.

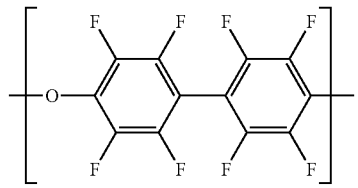

[Formula 3A]

According to an exemplary embodiment of the present application, Formula 4 may be represented by the following Formula 4A.

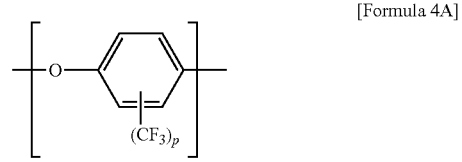

[Formula 4A]

In addition, according to an exemplary embodiment of the present application, the copolymer is a copolymer formed by including at least one unit of the units represented by the following Formulae 5, 6, 7, 8, 9, and 10.

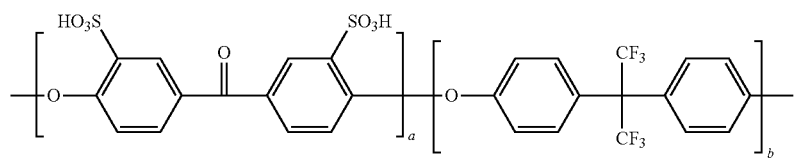

[Formula 5]

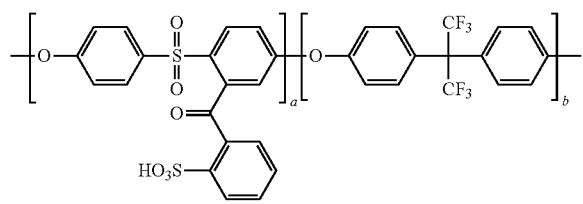

[Formula 6]

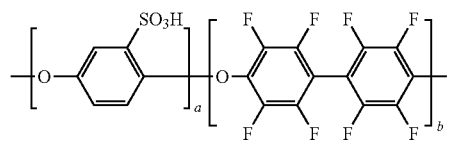

[Formula 7]

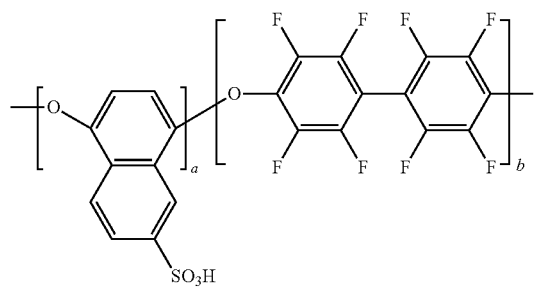

[Formula 8]

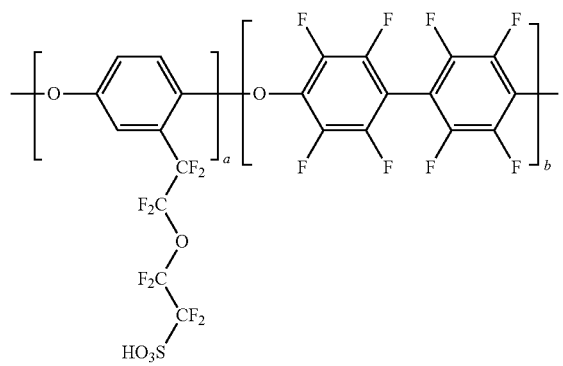

[Formula 9]

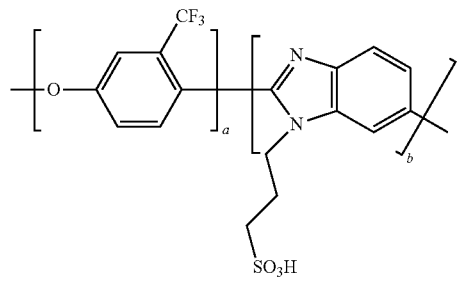

[Formula 10]

In Formulae 5 to 10, a and b mean a mole fraction relative to the entire copolymer. Here, it is possible to be a+b≤1, 0.1≤a≤0.9, and 0.1≤b≤0.9.

According to an exemplary embodiment of the present application, the copolymer is a copolymer including a unit represented by the following Formula 5.

According to an exemplary embodiment of the present application, the copolymer is a copolymer including a unit represented by the following Formula 6.

According to an exemplary embodiment of the present application, the copolymer is a copolymer including a unit represented by the following Formula 7.

According to an exemplary embodiment of the present application, the copolymer is a copolymer including a unit represented by the following Formula 8.

According to an exemplary embodiment of the present application, the copolymer is a copolymer including a unit represented by the following Formula 9.

According to an exemplary embodiment of the present application, the copolymer is a copolymer including a unit represented by the following Formula 10.

Furthermore, according to an exemplary embodiment of the present application, the copolymer is a homopolymer of any one of the units represented by the following Formulae 5, 6, 7, 8, 9, and 10, or a copolymer of the two or more units. Here, in the case of a copolymer, the copolymer may be an alternating copolymer, a block copolymer, a random copolymer, or a graft copolymer, and is preferably a block copolymer.

According to an exemplary embodiment of the present application, the copolymer has a weight average molecular weight of 10,000 to 1,000,000, specifically preferably 50,000 to 500,000, and more preferably 50,000 to 200,000. When the weight average molecular weight of the copolymer is less than 10,000, mechanical properties of the electrolyte membrane including the ion transport material deteriorate, and when the weight average molecular weight is more than 1,000,000, the solubility of the copolymer is decreased, and thus it is difficult to manufacture an electrolyte membrane including an ion transport material.

Since at least one monomer in the ion transport material according to an exemplary embodiment of the present application includes a copolymer having a fluorine group, unlike a hydrocarbon-based polymer, has an advantageous effect in that inorganic particles are selectively dispersed in the hydrophilic portion due to characteristics of the phase separation between a hydrophobic portion including a fluorine group and a hydrophilic portion containing sulfonic acid. Further, due to the apparent phase separation of the hydrophobic portion including a fluorine group and the hydrophilic portion including sulfonic acid and inorganic particles, the positive ion conductivity is improved, and simultaneously, there is an effect of preventing the cross over of the electrolyte material.

In addition, an exemplary embodiment of the present application provides an electrolyte membrane including the ion transport material.

In the present specification, the "electrolyte membrane" is a membrane which may exchange ions, and may be represented by a membrane, an ion exchange membrane, an ion transport membrane, an ion conductive membrane, a separation membrane, an ion exchange separation membrane, an ion transport separation membrane, an ion conductive separation membrane, an ion exchange electrolyte membrane, an ion transport electrolyte membrane, or an ion conductive electrolyte membrane, and the like.

According to an exemplary embodiment of the present application, the electrolyte membrane has a thickness of preferably 5 to 200 μm, and more preferably 10 to 100 μm. When the thickness of the electrolyte membrane is less than 5 μm, it is not possible to prevent the electric short and the cross over of the electrolyte material, and when the thickness is more than 200 μm, it is difficult to express excellent positive ion conductivity characteristics.

Furthermore, the electrolyte membrane according to an exemplary embodiment of the present application is in a form in which inorganic particles are bonded and dispersed in a partially fluorinated polymer containing sulfonic acid as previously defined, and mechanical properties are strengthened and the swelling phenomenon with respect to a solvent may be reduced as compared to the electrolyte membrane in the related art.

Further, the electrolyte membrane according to an exemplary embodiment of the present application has an excellent effect of preventing the cross over because inorganic particles are selectively dispersed only in the peripheral portion of the sulfonic acid group of the copolymer. Specifically, inorganic particles are selectively formed only in a positive ion channel by inducing inorganic particles to be formed only in the hydrophilic portion of the copolymer, that is, the peripheral portion of the sulfonic acid group. Accordingly, even though a small amount of inorganic particles are contained, there is a better effect of preventing the cross over of the electrolyte material produced along the ion channel as compared to the electrolyte membrane in the related art.

The cross over of the electrolyte material occurs through the hydrophilic portion containing a sulfonic acid group, and inorganic particles dispersed in the hydrophilic portion serve to block the flow of the electrolyte material.

In addition, there is an advantageous condition in which inorganic particles are selectively dispersed in the hydrophilic portion due to the phase separation of the hydrophobic portion containing a fluorine group and the hydrophilic portion containing a sulfonic acid group.

Furthermore, the sulfonic acid substituted with a fluorinated compound has a more advantageous condition in dispersing inorganic particles exhibiting hydrophilicity by forming a stronger acid condition than the sulfonic acid substituted with an aromatic compound.

Further, an exemplary embodiment of the present application provides a fuel cell including the electrolyte membrane.

A fuel cell is an energy conversion device that converts the chemical energy of a fuel directly into electrical energy. That is, the fuel cell uses a fuel gas and an oxidant, and employs a power generation system of producing electric power by using the electrons generated during the redox reaction of the fuel gas and the oxidant.

A membrane electrode assembly (MEA) of the fuel cell is a part in which an electrochemical reaction of hydrogen and oxygen occurs, and includes a cathode, an anode, and an electrolyte membrane, that is, an ion conductive electrolyte membrane.

When the electrolyte membrane according to the present invention is used as an ion exchange membrane of a fuel cell, the above-described effect may be exhibited.

Further, an exemplary embodiment of the present application provides a redox flow battery including the electrolyte membrane.

A redox flow battery (oxidation-reduction flow battery) is a system in which an active material included in an electrolytic solution is oxidized and reduced and thus charged and discharged, and an electrochemical storage device that stores the chemical energy of the active material directly into electrical energy. The redox flow battery uses a principle in which when electrolytic solutions including active materials having different oxidation states meet each other with an ion exchange membrane interposed therebetween, electrons are given and received, and thus the battery is charged and discharged. In general, the redox flow battery is composed of a tank containing an electrolytic solution, a battery cell in which the charge and discharge take place, and a circulation pump for circulating the electrolytic solution between the tank and the battery cell, and the unit cell of the battery cell includes an electrode, an electrolyte, and an ion exchange membrane.

When the electrolyte membrane according to the present application is used as an ion exchange membrane of a redox flow battery, the above-described effect may be exhibited.

In addition, another exemplary embodiment of the present application provides a method for manufacturing an electrolyte membrane, the method including: preparing solution A containing a copolymer including the unit of Formula 1 and at least one unit of the unit of Formula 2, the unit of Formula 3, and the unit of Formula 4; preparing solution B of a precursor of inorganic particles; mixing solutions A and B; and forming a membrane by using the mixture solution.

The manufacturing method according to the present application has an effect in which the process is simple because the solutions are mixed and the membrane is formed.

Furthermore, the manufacturing method forms a membrane and simultaneously disperses inorganic particles and thus is simpler than the process of forming a membrane and absorbing or dispersing inorganic particles in the related art, and has an effect in that it is possible to control the characteristics of inorganic particles in the step of manufacturing the membrane.

Further, the manufacturing method may reduce the aggregation phenomenon of inorganic particles and increase the dispersion degree by using a solution of a precursor of inorganic particles, and has an effect in that it is possible to adjust the size and content of inorganic particles, unlike the method of dispersing inorganic particles as they are. That is, the manufacturing method may uniformly disperse the inorganic particles over a wide region by using a solution of a precursor of inorganic particles to disperse the precursor before the inorganic particles are formed, and has an effect in that an electrolyte membrane may be manufactured by adjusting the size and content of the inorganic particles.

In addition, there is an advantage in that the aforementioned effect may be obtained under the process conditions of manufacturing the membrane without a separate additional process.

According to an exemplary embodiment of the present application, at least one step of preparing solution B of a precursor of inorganic particles and mixing solutions A and B may include adjusting the size or content of the inorganic particles.

According to an exemplary embodiment of the present application, the manufacturing method further includes applying a membrane on a substrate, and heating the membrane after the mixing of solutions A and B.

The heating means curing through heating, and the precursor of inorganic particles forms inorganic particles by the heating. In this case, since the precursor of inorganic particles is formed as inorganic particles during the curing process after the silica precursor is dispersed, an aggregation phenomenon of the inorganic particles is reduced, and inorganic particles may be uniformly dispersed around the sulfonic acid group.

Since the partially fluorinated polymer of the present application contains a sulfonic acid group in the polymer chain, the polymer may react with a precursor of inorganic particles to manufacture an electrolyte membrane without separately adjusting the pH.

According to an exemplary embodiment of the present application, the solution of a precursor of inorganic particles includes a precursor of inorganic particles and a solvent.

In the present specification, the precursor of inorganic particles means a material which forms inorganic particles before forming the inorganic particles.

According to an exemplary embodiment of the present application, the precursor of inorganic particles may be specifically at least one selected from tetraethyl orthosilicate (TEOS), tetramethyl orthosilicate (TMOS), 3-glycidyloxypropyltrimethoxysilane (GOTMS), monophenyl triethoxysilane (MPh), polyethoxysilane (PEOS), 3-glycidoxypropyltrimethoxysilane, vinyltriethoxysilane, 3-aminopropyltrimethoxysilane, 3-aminopropyltriethoxysilane, N-2-aminoethyl-3-aminopropyltrimethoxysilane, N-(beta-aminoethyl)gamma-aminopropyltrimethoxysilane, N-(beta-aminoethyl)gamma-aminopropylmethyldimethoxysilane, gamma-ureidopropyltrimethoxysilane, 3-mercaptopropyltrimethoxysilane, and 3-isocyanatopropyltrimethoxysilane.

The precursor of inorganic particles may be used alone or in mixtures of two or more thereof.

According to an exemplary embodiment of the present application, the inorganic particle is silica.

According to an exemplary embodiment of the present application, characteristics of the inorganic particles such as size and content are the same as those described above.

According to an exemplary embodiment of the present application, the solvent may include one or more selected from water and alcohols. For example, the solvent includes water and ethanol.

[Mode for Invention]

Hereinafter, the present application will be described in more detail through the Examples. However, the following Examples are provided for illustrating the present application, and the scope of the present application is not limited thereby.

EXAMPLE 1

A paint composition was prepared by stirring 150 g of a fluorinated copolymer solution having a solid content concentration of 15 wt % of a copolymer including the unit of Formula 5 (a:b=1:1), 10 g of tetraethoxysilane, and 2 g of distilled water. An ion transport material having a thickness of 50 μm was obtained by applying the composition on a strengthened glass substrate and curing the composition. The copolymer had a weight average molecular weight of 200,000, the dispersion ratio of inorganic particles in the a portion and the b portion of Formula 5 was 90 wt %:10 wt % based on the total weight of the inorganic particles, and the inorganic particles had a size of 10 to 50 nm. When the ion transport material was used as an electrolyte membrane, the electrolyte membrane had ion conductivity of 0.15 S/cm, and the electrolyte ($VO^{2+}$) material had a cross over of about $1\times10^{-7}$ $cm^2$/min.

EXAMPLE 2

Example 2 was performed in the same manner as in Example 1, except that a copolymer including the unit of Formula 6 was used instead of the copolymer including the unit of Formula 5. The copolymer had a weight average molecular weight of 200,000, the dispersion ratio of inorganic particles in the a portion and the b portion of Formula 6 was 80%:20% based on the total weight of the inorganic particles, and the inorganic particles had a size of 10 to 50 nm. When the ion transport material was used as an electrolyte membrane, the electrolyte membrane had ion conductivity of 0.13 S/cm, and the electrolyte ($VO^{2+}$) material had a cross over of about $1\times10^{-7}$ $cm^2$/min.

EXAMPLE 3

Example 3 was performed in the same manner as in Example 1, except that a copolymer including the unit of Formula 7 was used instead of the copolymer including the unit of Formula 5. The copolymer had a weight average molecular weight of 150,000, the dispersion ratio of inorganic particles in the a portion and the b portion of Formula 7 was 80%:20% based on the total weight of the inorganic particles, and the inorganic particles had a size of 10 to 50 nm. When the ion transport material was used as an electrolyte membrane, the electrolyte membrane had ion conductivity of 0.12 S/cm, and the electrolyte ($VO^{2+}$) material had a cross over of about $1\times10^{-7}$ $cm^2$/min.

EXAMPLE 4

Example 4 was performed in the same manner as in Example 1, except that a copolymer including the unit of Formula 8 was used instead of the copolymer including the unit of Formula 5. The copolymer had a weight average molecular weight of 200,000, the dispersion ratio of inorganic particles in the a portion and the b portion of Formula 8 was 80%:20% based on the total weight of the inorganic particles, and the inorganic particles had a size of 10 to 50 nm. When the ion transport material was used as an electrolyte membrane, the electrolyte membrane had ion conductivity of 0.12 S/cm, and the electrolyte ($VO^{2+}$) material had a cross over of about $1\times10^{-7}$ $cm^2$/min.

EXAMPLE 5

Example 5 was performed in the same manner as in Example 1, except that a copolymer including the unit of Formula 9 was used instead of the copolymer including the unit of Formula 5. The copolymer had a weight average molecular weight of 200,000, the dispersion ratio of inorganic particles in the a portion and the b portion of Formula 9 was 90%:10% based on the total weight of the inorganic particles, and the inorganic particles had a size of 10 to 50 nm. When the ion transport material was used as an electrolyte membrane, the electrolyte membrane had ion conductivity of 0.16 S/cm, and the electrolyte ($VO^{2+}$) material had a cross over of about $1\times10^{-7}$ $cm^2$/min.

EXAMPLE 6

Example 6 was performed in the same manner as in Example 1, except that a copolymer including the unit of Formula 10 was used instead of the copolymer including the unit of Formula 5. The copolymer had a weight average molecular weight of 150,000, the dispersion ratio of inorganic particles in the a portion and the b portion of Formula 10 was 20%:80% based on the total weight of the inorganic particles, and the inorganic particles had a size of 10 to 50 nm. When the ion transport material was used as an electrolyte membrane, the electrolyte membrane had ion conductivity of 0.13 S/cm, and the electrolyte ($VO^{2+}$) material had a cross over of about $1\times10^{-7}$ $cm^2$/min.

COMPARATIVE EXAMPLE

A paint composition was prepared by stirring 150 g of a hydrocarbon-based copolymer solution having a concentration of 15 wt % relative to the solid content, 10 g of tetraethoxysilane, and 2 g of distilled water. An electrolyte membrane having a thickness of 50 μm was obtained by applying the composition on a strengthened glass substrate and curing the composition. The copolymer had a weight average molecular weight of 200,000, silica was dispersed over the entire copolymer, and the dispersed silica had a diameter of 10 to 50 nm. The electrolyte membrane had ion conductivity of 0.10 S/cm, and the electrolyte ($VO^{2+}$) material had a cross over of about $4\times10^{-7}$ $cm^2$/min.

The invention claimed is:

1. An ion transport material comprising:
    a copolymer comprising a unit of the following Formula 1 and at least one unit of a unit of the following Formula 2, a unit of the following Formula 3, or a unit of the following Formula 4; and
    inorganic particles dispersed in a peripheral portion of a sulfonic acid group of the copolymer, wherein a ratio of a weight of inorganic particles dispersed in a portion including the unit of Formula 1 to a weight of inorganic particles dispersed in a portion including at least one unit of the units of Formulae 2 to 4 in the copolymer is 70%:30% to 100%:0% based on a total weight of the inorganic particles:

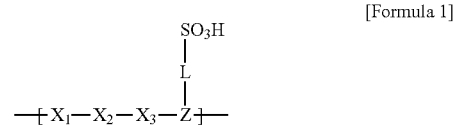

[Formula 1]

-continued

[Formula 2]
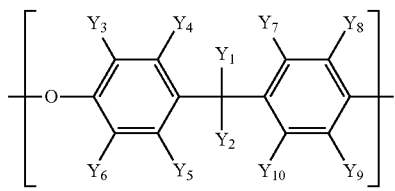

[Formula 3]
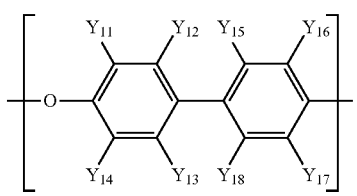

[Formula 4]
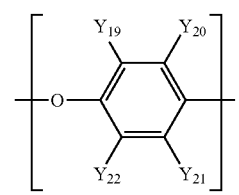

in Formula 1,
Z is a trivalent aromatic cyclic group or a trivalent heterocyclic group,
L is a direct bond, or a divalent linking group, and
$X_1$ to $X_3$ are the same as or different from each other, and are each independently a direct bond, oxygen (O), a carbonyl group (—CO—), a sulfone group ($SO_2$—), an arylene group, a heteroarylene group, or *—Z-L-$SO_3H$, and * represents a portion which is linked to a main chain, and
in Formulae 2 to 4,
$Y_1$ to $Y_{22}$ are the same as or different from each other, and are each independently hydrogen (H), fluorine (F), or a substituted or unsubstituted alkyl group, and
the units of Formulae 2 to 4 each have at least one fluorine substituent.

2. The ion transport material of claim 1, wherein L is a direct bond, an alkylene group, an alkenylene group, an alkynylene group, —[(CRR')$_r$O(CR"R''')$_s$]$_t$—, or —CO—Ar—, R, R', R", and R''' are the same as or different from each other, and are each independently hydrogen, an alkyl group, or a halogen group, r and s are 0 to 3, t is 1 to 5, and Ar is an arylene group or a heteroarylene group.

3. The ion transport material of claim 1, wherein L is —(CH$_2$)$_m$[(CF$_2$)$_2$O(CF$_2$)$_2$]$_n$—, and m and n are an integer of 0 to 5.

4. The ion transport material of claim 1, wherein the substituted or unsubstituted alkyl group is —(CQQ')$_p$Q" as an alkyl group having 1 to 10 carbon atoms, Q, Q', and Q" are hydrogen (—H) or fluorine (—F), and p is 1 to 10.

5. The ion transport material of claim 1, wherein the inorganic particle is silica.

6. The ion transport material of claim 1, wherein a content of the inorganic particles is 2 to 30 parts by weight based on 100 parts by weight of a solid content of the ion transport material.

7. The ion transport material of claim 1, wherein the inorganic particles have a diameter of 5 to 200 nm.

8. The ion transport material of claim 1, wherein the copolymer has a weight average molecular weight of 10,000 to 1,000,000.

9. An electrolyte membrane comprising the ion transport material of claim 1.

10. The electrolyte membrane of claim 9, wherein the electrolyte membrane has a thickness of 5 to 200 μm.

11. A fuel cell comprising the electrolyte membrane of claim 9.

12. A redox flow battery comprising the electrolyte membrane of claim 9.

13. A method for manufacturing an electrolyte membrane, the method comprising:
mixing solutions A and B; and
forming a membrane by using the mixture solution,
wherein solution A contains a copolymer comprising a unit of the following Formula 1 and at least one unit of a unit of the following Formula 2, a unit of the following Formula 3, or a unit of the following Formula 4,
wherein solution B contains a precursor of inorganic particles, and
wherein the membrane having an ion transport material comprising the copolymer and the inorganic particles, wherein a ratio of a weight of inorganic particles dispersed in a portion including the unit of Formula 1 to a weight of inorganic particles dispersed in a portion including at least one unit of the units of Formulae 2 to 4 in the copolymer is 70%:30% to 100%:0% based on a total weight of the inorganic particles:

[Formula 1]
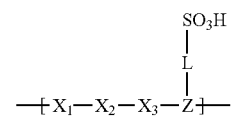

[Formula 2]
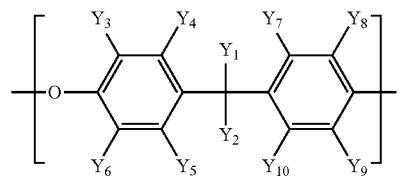

[Formula 3]
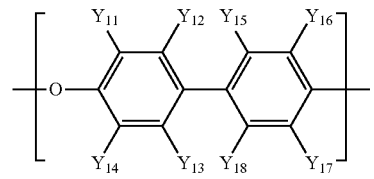

[Formula 4]
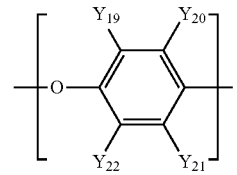

in Formula 1,
Z is a trivalent aromatic cyclic group or a trivalent heterocyclic group,
L is a direct bond, or a divalent linking group, and
$X_1$ to $X_3$ are the same as or different from each other, and are each independently a direct bond, oxygen (O), a carbonyl group (—CO—), a sulfone group (—$SO_2$—), an arylene group, a heteroarylene group, or *—Z-L-SO$_3$H, and * represents a portion which is linked to a main chain, and in Formulae 2 to 4, Y$_1$ to Y$_{22}$ are the same as or different from each other, and are each independently hydrogen (H), fluorine (F), or an alkyl group unsubstituted or substituted with fluorine, and the units of Formulae 2 to 4 each have at least one fluorine substituent.

14. The method of claim 13, wherein L is a direct bond, an alkylene group, an alkenylene group, an alkynylene group, —[(CRR')$_r$O(CR"R''')$_s$]$_t$—, or —CO—Ar—, R, R', R", and R''' are the same as or different from each other, and are each independently hydrogen, an alkyl group, or a halogen group, r and s are 0 to 3, t is 1 to 5, and Ar is an arylene group or a heteroarylene group.

15. The method of claim 13, wherein L is —((CH$_2$)$_m$[(CF$_2$)$_2$O(CF$_2$)$_2$)]$_n$—, and m and n are an integer of 0 to 5.

16. The method of claim 13, wherein the substituted or unsubstituted alkyl group is —(CQQ')$_p$Q" as an alkyl group having 1 to 10 carbon atoms, Q, Q', and Q" are hydrogen (—H) or fluorine (—F), and p is 1 to 10.

17. The method of claim 13, wherein the precursor of inorganic particles is at least one selected from tetraethyl orthosilicate (TEOS), tetramethyl orthosilicate (TMOS), 3-glycidyloxypropyltrimethoxysilane (GOTMS), monophenyl triethoxysilane (MPh), polyethoxysilane (PEOS), 3-glycidoxypropyltrimethoxysilane, vinyltriethoxysilane, 3-aminopropyltr imethoxysilane, 3-aminopropyltriethoxysilane, N-2-aminoethyl-3-aminopropyltrimethoxysilane, N-(beta-aminoethyl)gamma-aminopropyltrimethoxysilane, N-(beta-aminoethyl)gamma-aminopropylmethyldimethoxysilane, gamma-ureidopropyltrimethoxysilane, 3-mercaptopropyltrimethoxysilane, and 3-isocyanatopropyltrimethoxysilane.

18. The method of claim 13, wherein the forming of the membrane by using the mixture solution comprises applying a membrane on a substrate, and heating the membrane.

19. The method of claim 13, wherein the solution of the precursor of inorganic particles comprises a precursor of inorganic particles and a solvent.

* * * * *